Aug. 28, 1923.
C. W. MABEY
1,466,595
SHOWCASE MACHINE FOR POPPING CORN
Filed Aug. 14, 1922
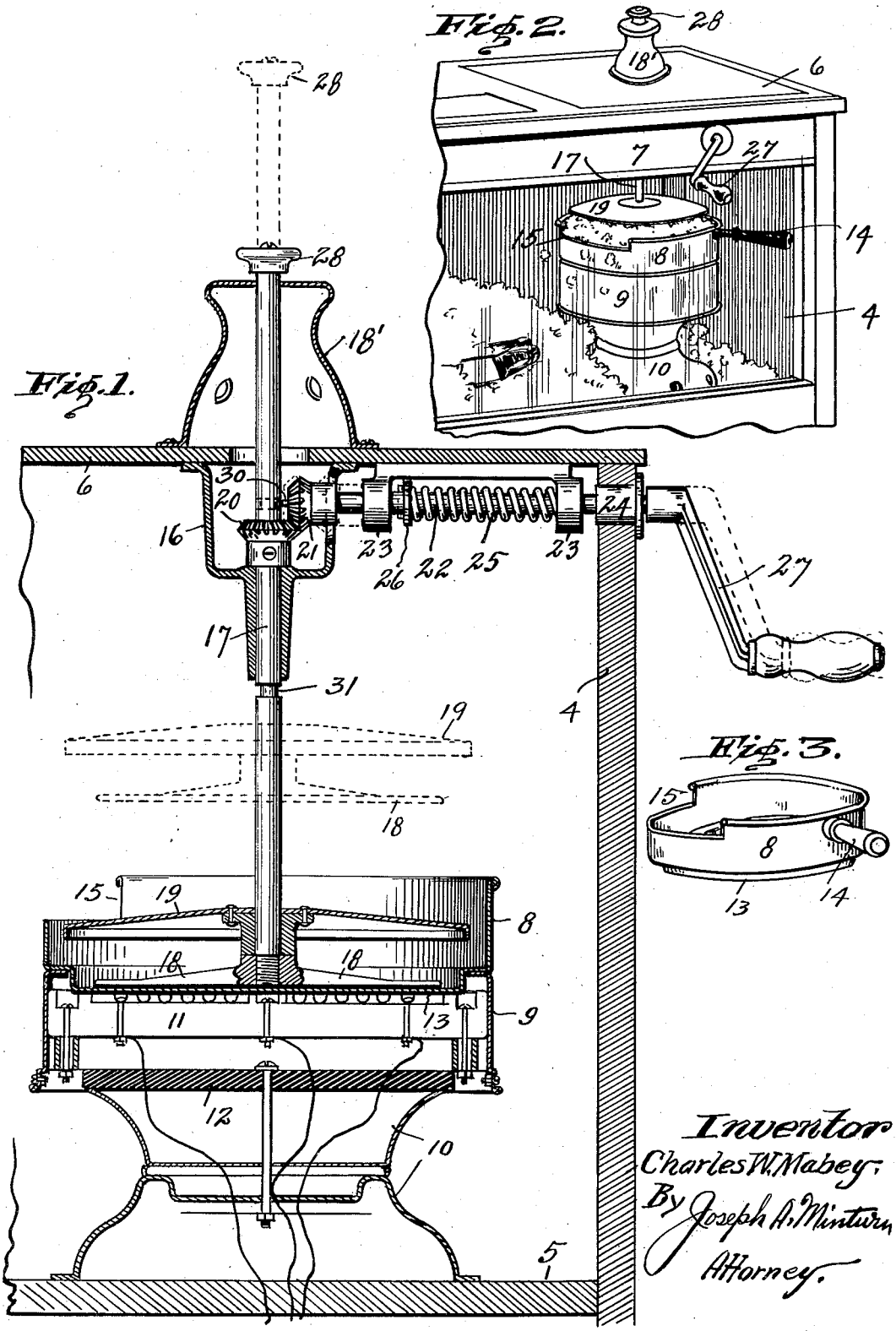

Patented Aug. 28, 1923.

1,466,595

UNITED STATES PATENT OFFICE.

CHARLES W. MABEY, OF INDIANAPOLIS, INDIANA.

SHOWCASE MACHINE FOR POPPING CORN.

Application filed August 14, 1922. Serial No. 581,556.

*To all whom it may concern:*

Be it known that I, CHARLES W. MABEY, a citizen of the United States, residing at Indianapolis, in the county of Marion and State of Indiana, have invented new and useful Improvements in Showcase Machines for Popping Corn, of which the following is a specification.

The object of this invention is to provide a corn popper located within a showcase, and means extending to the outside of the case for manually agitating the corn during the popping operation, to keep it from burning.
A further object is to provide a convenient means for so removing the stirring mechanism that the pan in which the corn is popped will be free for removal from the heater for emptying.
These principal objects, and other minor ones which will hereinafter appear, are accomplished by the means illustrated in the acompanying drawing, in which—

Fig. 1, is a vertical section of the invention on a plane longitudinally of the handcrank shaft, showing the mechanism in popping position in full lines, and the agitator and pan-cover in raised position in dotted lines. Fig. 2, is a perspective view on a reduced scale of a portion of a showcase, with my invention in operative position therein, and Fig. 3, is a perspective view of the pan removed from all other of its associated parts.
Like characters of reference indicate like parts throughout the several views of the drawing.

The showcase 4 is of any usual and suitable construction and has a floor 5, a top 6, and a rear side 7.

The corn while popping is placed in a sheet metal pan 8, which is removably supported on a housing 9 having a hollow base 10 that rests upon the floor 5 of the case.
Any suitable generator of heat may be employed to heat the pan. In the present embodiment of my invention an electric resistance 11, is assembled within the housing above an insulation 12; but a gas, oil, charcoal, or other known form of heater may be substituted for said electric one.

The pan 8 preferably has the central portion of its bottom depressed at 13 to enter a corresponding hole in the housing 9 to secure the position of the pan. The latter is provided with a handle 14, by which it is placed and also removed for dumping the popped corn, and to allow for an overflow to relieve congestion while the popping is in progress, I prefer to remove the upper side wall as shown at 15, on the side next to the interior of the showcase, to deliver the corn there where it will be most out of the way of the operation of the popper.

Depending from the top 6 of the case is a hanger 16 in which a shaft 17 is journaled. The shaft extends through the top 6, and through the cap 18', which cap is upwardly elongated to increase the distance between the support of the shaft bearings and thereby maintain the vertical position of the shaft more accurately. On the lower end of the shaft 17 is an agitator or stirrer comprising a hub with a plurality of arms 18 that sweep the bottom of the pan to keep the corn from burning. Loosely mounted on the shaft 17 above the stirrer, is a cover 19, that is free to rise with the pressure of the popping corn below it, and which will be lifted out of the pan by the stirrers when the latter are removed by a suitable upward longitudinal movement of the shaft. Fixed on the shaft 17 within the recess of hanger 16 is a beveled pinion 20, which meshes with a similar pinion 21 on a horizontal shaft 22.

The shaft 22 is mounted in a pair of spaced-apart hangers 23, 23, depending from the top 6 of the case and also is journaled in a box 24 in the rear wall of the case. The shaft 22 is adjustable longitudinally, but it is normally pressed toward the shaft 17, by a spring 25, wrapped around the shaft 22, and bearing at one end against the outer hanger 23, and at the other end against a collar 26 fixed on the shaft 22. A crank 27, on the outer end of the shaft 22, provides means for manually rotating the shaft and also for moving it longitudinally against the tension of the spring.

The shaft 17, terminates at its upper end with a knob 28, and by pulling upwardly on this knob the stirrers 18 and pan-cover 19 will be removed to the position shown by the dotted lines in Fig. 1, which leave the pan 8 free to be lifted out by its handle and emptied. The shaft 17 is held in this elevated position by the entrance of a reduced end 30 of the shaft 22 into an annular channel 31, in shaft 17, by the action of the spring 25. The operation of my invention is as follows:—Unpopped corn is placed on the cover 19 and is rolled off into the pan 8 by manually rotating the shaft 17 through crank 27. The stirrers 18 are simultaneously rotated, and as the corn is popped it discharges in part through the opening 15 in the side of the pan. After the popping operation is completed the shaft 22 is drawn out to the position shown by dotted lines in Fig. 1, which removes its pinion 21 out of the way of the pinion 20. The shaft 17 is then readily raised manually to the position shown in dotted lines where it is held by the engagement of the reduced end 30 in the channel 31 of said shaft 17, and the stirrers and cover being then held up out of the way, the pan is easily lifted out of its seat and its contents poured into the showcase.

The pan is then replaced in the shaft 17 and is manually lowered by first releasing it by withdrawing the member 30 from the channel 31.

Having thus fully described my invention, what I claim as new and wish to secure by Letters Patent, is—

1. The combination, within a showcase, of a heating element in the case, a pan removably placed upon the heating element, a stirrer in the pan, means extending outside of the case for manually operating the stirrer, means for removing the stirrer to a position out of interference with the removal of the pan, and spring actuated means for holding said last means in said removed position of the stirrer.

2. The combination, within a showcase, of a heating element within the case, a pan removably held upon the heating element, a stirrer within the pan, manually operated means for operating the stirrer extending outside of the case, means for removing the stirrer to a position out of interference with the removal of the pan and means comprising said manually operated means for holding said last means in said removed position of the stirrer.

3. The combination, within a showcase, of a heater in the case, a pan removably supported upon the heater, a stirrer located in the pan, a shaft on which the stirrer is mounted, said shaft being adjustable longitudinally to lift the stirrer from the pan and extending outside of the case for accessibility for said adjustment, and manually operated means on the outside of the showcase for rotating the shaft in its lowered position and for locking the shaft in its raised position.

4. The combination, within a showcase, of a heater in the case, a pan removably supported upon the heater, a stirrer located in the pan, a shaft on which the stirrer is mounted, said shaft being adjustable longitudinally to lift the stirrer from the pan and extending outside of the case for accessibility for such adjustment, said shaft having an annular groove, a counter-shaft extending outside of the case, adjustable longitudinally and having a reduced inner end, gears drivingly connecting the two shafts, resilient means for moving the counter-shaft toward the first shaft, and a crank on the outer end of the counter-shaft.

5. The combination, within a showcase, of a heater in the case, a pan on the heater, a stirrer in the pan, a shaft on which the stirrer is mounted, a bevel gear wheel on the shaft, a counter-shaft adjustable longitudinally, a bevel gear wheel fixed on a counter-shaft meshing with the one on the first shaft, and a spring contacting the end of the counter-shaft against the first shaft to keep the bevel gears from binding against each other.

Signed at Indianapolis, Indiana, this the 12th day of August, 1922.

CHARLES W. MABEY.